July 3, 1923.
R. M. LOVEJOY
1,460,856
SHOCK ABSORBER CONNECTION
Filed Feb. 11, 1920
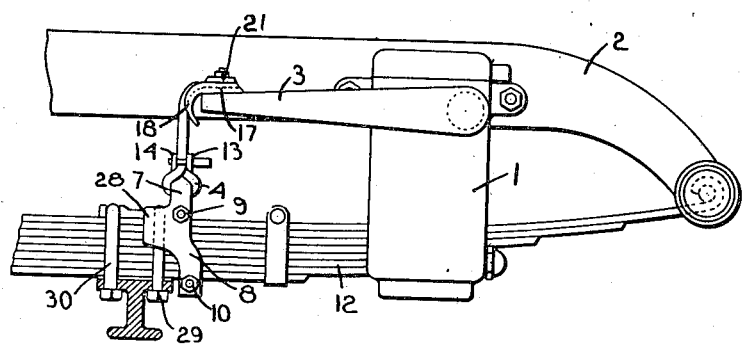
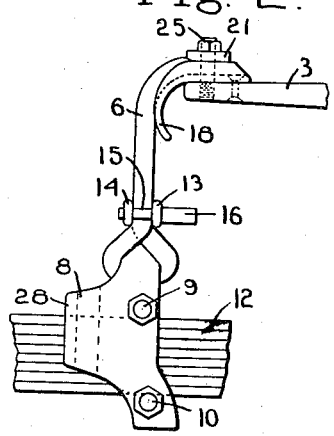
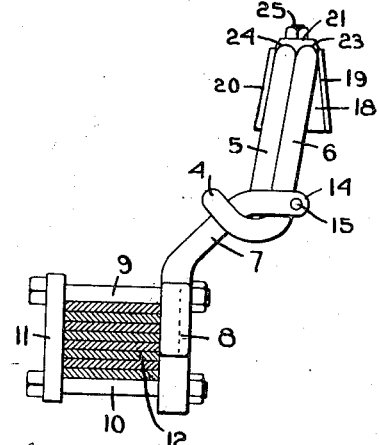
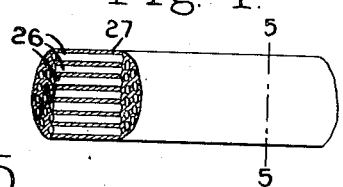
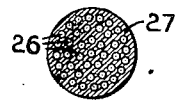
Inventor
Ralph M. Lovejoy
by Heard Smith & Tennant.
Attys.

Patented July 3, 1923.

1,460,856

UNITED STATES PATENT OFFICE.

RALPH M. LOVEJOY, OF MEREDITH, NEW HAMPSHIRE.

SHOCK-ABSORBER CONNECTION.

Application filed February 11, 1920. Serial No. 357,996.

*To all whom it may concern:*

Be it known that I, RALPH M. LOVEJOY, a citizen of the United States, and resident of Meredith, county of Belknap, State of New Hampshire, have invented an Improvement in Shock-Absorber Connections, of which the following description, in connection with the accompanying drawing, is a specification, like characters on the drawing representing like parts.

This invention relates to improvements in shock absorber connections and the object thereof is to provide a novel connection between the force-resisting instrumentality of the shock absorber and the mechanism which is movable relatively to the shock absorber.

More specifically, the invention relates to improvements in connections for shock absorbers applied to vehicles, such as automobiles, for the purpose of cushioning the rebound which results from the action of the springs when the vehicle is passing over a rough or uneven road.

The connections between the axles and frame of an automobile or other vehicle, which includes a spring support for the frame and body of the vehicle, are necessarily such that the frame and body are permitted a limited movement in all directions so as to permit the independent action of the springs which support the frame and body. The connection between the springs and frame is such that when the springs are depressed, a limited longitudinal movement of the body relatively to the axles occurs while the lateral flexing of the springs, when one side is depressed more than another, causes a limited lateral movement of the body relatively to the axle.

Where shock absorbers are employed the force-resisting member of the shock absorber is supported upon one of the relatively movable members and connected to the other relatively movable member. This connection, therefore, must be such as will accommodate itself to all of the various relative movements of the members. Where rigid connections are used the joints quickly become worn and an annoying rattling results. This objectionable feature of shock absorber connections was obviated by the construction in my prior Patent No. 1,324,913, granted December 16, 1919, in which a flexible strap is used to connect the force-resisting instrumentality of the shock absorber to the axle and in which the strap was carried around the axle, but it was found that the relative lateral movement of the frame relatively to the axle caused a bending of the strap edge-wise at its connection with the shock absorber arm which in time caused the strap to break.

One of the objects of the present invention, therefore, is to provide a flexible connection between the force-resisting instrumentality of the shock absorber and the member which is movable relatively to it, which will accommodate itself to the relative movements of said members without producing such a bending of the connection as to cause its breakage.

Another object of the invention is to provide novel means for anchoring the loop of the flexible connecting member to the mechanism which is movable relatively to the force resisting instrumentality.

A further object of the invention is to provide a flexible shock absorber connection comprising a looped member which will automatically cause a substantially equal tension to be imposed upon each of the limbs of the loop.

Another object of the invention is to provide a guiding means for the flexible member which will prevent a sharp bending thereof in any direction due to the relative movements of the movable members.

Another object of the invention is to provide a shock absorber connection which can be easily applied to standard types of automobiles and which can be readily assembled and replaced.

Another object of the invention is to provide a novel bracket for a flexible shock absorber connection comprising a looped member, in which the bracket has means for engaging the loop and also means for guiding the limbs of the loop, the construction being such as to make the equal tension upon the limbs of the loop self-adjusting.

Another object of the invention is to provide a novel form of flexible instrumentality for connecting the shock absorber to the member which is movable relatively thereto. It has been found by experience, and by experiments, that where a connection, embodying tightly woven strands, is employed the connection will stretch when subjected to use, thereby impairing the efficiency of the shock absorber or requiring frequent adjustment. Furthermore, the crossing of the strands of such a connection reduces the flexibility thereof and renders the connection much more likely to break.

Another object of the invention, therefore, is to provide a flexible instrumentality comprising substantially parallel strands, means preferably being provided to prevent abrasion or chafing of the strands upon each other by reason of the flexing of said instrumentality. This preferably is accomplished by providing a flexible instrumentality comprising a series of parallel strands of fibrous material, or of loosely braided strands of fibrous material, said strands being impregnated with, or imbedded in, a material which will reduce or prevent the chafing action of the strand as they slip upon each other during the flexing of said instrumentality.

The preferred form of flexible instrumentality disclosed herein comprises a series of strands of fibrous material imbedded in elastic rubber, the strands being so arranged that the flexible member is in the form of a rope having substantially circular cross section. By reason of this construction a flexible connecting instrumentality is produced which, when subjected to a predetermined tension during manufacture, will not stretch to any appreciable extent when in use and which will bend freely in any direction, so that the likelihood of breakage when the flexible instrumentality is used as a shock absorber connection is reduced to a minimum.

Other objects and features of the invention will more fully appear from the following description and the accompanying drawings and will be particularly pointed out in the annexed claims.

A preferred embodiment of my invention is disclosed in the accompanying drawings as applied to a shock absorber of the character illustrated in my prior Patent No. 1,324,913, aforesaid.

In the drawings:

Fig. 1 is a side elevation of the front end of the frame and spring of a vehicle with a shock absorber having a connection embodying the preferred form of my invention assembled thereon.

Fig. 2 is a detail enlarged side elevation of the shock absorber connection in a position similar to that illustrated in Fig. 1.

Fig. 3 is an elevation looking toward the end of the shock absorber arm showing the flexible connection having a loop embracing a bracket which is secured to a vehicle spring, which is shown in cross section.

Fig. 4 is a side elevation, partly in section, of a flexible instrumentality particularly adapted for use in shock absorbers.

Fig. 5 is a transverse sectional view of the same on lines 5—5, Fig. 4.

The shock absorber connection, which forms the subject matter of this application, is disclosed herein as applied to a shock absorber 1, which is of the type disclosed in my prior patent aforesaid, which is shown as suspended upon the front end of a typical frame 2 of an automobile.

The shock absorber is provided with a force-resisting instrumentality including an arm 3 which is connected to the spring or axle which is movable relatively to the frame 2, as disclosed in my prior patent aforesaid. The means for connecting the end of the arm 3 to the spring or axle comprises a flexible instrumentality, preferably of circular cross section, like a rope, the ends being connected to the arm 3 so that the flexible connection presents a loop 4 adapted to embrace a part of the mechanism which is movable relatively to the shock absorber arm, the limbs 5 and 6 of said loop being secured to the arm 3.

The loop 4 may embrace the axle of the vehicle, as illustrated in my prior patent aforesaid, or the spring, or may be connected to a bracket which is suitably secured to the member which is movable relatively to the shock absorber arm. Desirably the bracket is provided with a guideway to receive and confine the limbs of the loop in juxtaposition while the bight of the loop embraces a suitable anchoring member which will prevent the withdrawal of the bight of the loop through the guideway. This anchoring member may be the arm itself or an independent member engaged by the bight of the loop of sufficient size to prevent the withdrawal of the loop through the guideway.

As illustrated herein the loop embraces an obliquely offset cylindrical arm 7 of a bracket 8 which is secured by bolts 9 and 10 and a clip 11 to the spring 12 of the vehicle. The arm 7 of the bracket is provided with a bifurcated end portion, the arms 13 and 14 of which provide guides which embrace the limbs 5 and 6 of the loop. Suitable means may be provided for confining the limbs of the loop within the guide-way provided by the bifurcated end of the arm 7. A convenient means, which is illustrated herein, comprises a pin 15 having an extension 16 which underlies the end portion of the arm 3 and is adapted to support said arm in case of breakage or disability of the shock absorber. Instead of providing a pin or extension 16, the bracket may be provided with an arm or ledge to support the arm 3. In such case means are provided for guiding the upper ends of the limbs 5 and 6 of the loop in such a manner as to prevent a sharp bending thereof which will cause a breakage of the flexible member.

As disclosed herein, a guide plate 17, having a convexedly curved downwardly depending end portion 18, is secured to, or formed integral with, the end of the arm 3, the curvature of the end portion 18 being such as to prevent a sharp bending of the limbs 5 and 6 of the flexible member by reason of the relative longitudinal movement of the frame and axle and the arcuate movement of the end of the arm 3.

The curved end portion 18 of the guide plate desirably is provided with flanges 19 and 20 which diverge sufficiently at their lower ends to permit slight side-way movement of the limbs 5 and 6 of the loop which occur from the lateral relative movement of the frame and spring.

The ends of the limbs 5 and 6 of the flexible member desirably are secured to the arm 3 and guide plate 17 by a saddle 21 having a pair of curved sockets 23, 24, which substantially fit the surfaces of the limbs 5 and 6, said saddle being secured to the arm by a bolt 25 extending to the plate 17 and arm 3.

Preferably the bracket 8 and arm 7 are so constructed that the limbs 5 and 6 of the loop extend upwardly at a slight angle to the vertical longitudinal plane of the force-resisting arm of a shock absorber, so that a lateral tension in one direction will always be maintained upon the arm which will prevent endwise movement of the shaft of the shock absorber arm and thereby avoid any jarring or rattling.

Any suitable cord or rope of fibrous material may be employed as a flexible connecting instrumentality for shock absorbers, although it is found that wire rope or ropes having great rigidity are comparatively easily broken by reason of the flexing action above described.

Preferably the flexible instrumentality is composed of a series of strands which are parallel to each other and parallel to the axis of said instrumentality, although a flexible member comprising loosely braided strands, which are substantially parallel, is found to be quite satisfactory, particularly where such strands are impregnated with a friction reducing medium, such as oil, bees-wax, rubber, and the like.

The preferred flexible instrumentality illustrated in Figs. 4 and 5 comprises a series of strands or small cords 26 of fibrous material, such as high grade cotton hemp or the like, imbedded in or impregnated with elastic rubber 27, the rubber serving to hold the strands together as a substantially round rope-like instrumentality and also to permit free relative longitudinal and lateral movements of the strands relatively to each other.

The elastic filling and binding material further provides friction reducing medium which prevents abrasion or chafing of the strands by reason of such relative movement.

Inasmuch as the strands form a flexible instrumentality of this character and are substantially parallel the flexible instrumentality will not stretch to any such extent as a rope or braided cord in which a tension imposed upon the rope or cord causes the strands thereof to become more closely associated and in doing so to lengthen in proportion to the transverse reduction.

As a matter of fact it is found that a braided cord will stretch approximately 10% of its length when subjected to a breaking tension and in the use of braided cords for shock absorber connections it has been customary to subject the cord to such breaking tension in order to produce a connection which will not stretch unduly.

The novel flexible member illustrated in Figs. 4 and 5, when subjected to a proper tension during manufacture, will be of such a character that no substantial stretching will result from continued use and by the omission of the twisting or braiding of the strands a more highly flexible connection is provided which is less likely to break under the continuous lateral bending in all directions to which the connection is subjected when in use.

The bracket 8 preferably is provided with means such as a hook-like extension 28, which embraces one of the spring clips 29 and 30, and thereby prevents the bracket from slipping upon the spring.

It will be understood that the embodiment of the invention disclosed herein is of an illustrative character and is not restrictive and that various modifications may be made within the spirit and scope of the following claims.

Having thus described my invention, what I claim as new and desire to secure by Letters Patent, is:

1. A shock absorber connection comprising a flexible member rigidly connected to the force resisting instrumentality of a shock absorber and presenting a loop and a member of the mechanism which is movable relatively to said shock absorber having a slot forming a guideway to receive and confine the limbs of said loop and means engaging the bight of the loop beyond said slot acting to prevent the withdrawal of the loop through said guideway.

2. A shock absorber connection including a cylindrical flexible member having its ends connected rigidly to the force resisting instrumentality of a shock absorber and presenting a loop and a bracket, connected to the mechanism which is movable relatively to said shock absorber, having an arm provided with a slot forming a guideway to receive and confine the limbs of the loop and means engaging the bight of the loop acting to prevent the withdrawal of the loop through said guideway.

3. A shock absorber connection including a flexible member having its ends connected rigidly to the force-resisting instrumentality of the shock absorber and presenting a loop, a bracket connected to the mechanism which is movable relatively to said shock absorber, having an arm passing through the loop and provided with a bifurcated end portion providing a slot to guide the limbs of the loop and a pin crossing said slot acting to prevent displacement of the limbs of the loop from said slot.

4. A connection for shock absorbers having force-resisting means including a pivotally mounted arm, a curved guide upon the free end of said arm, a flexible member, substantially cylindrical in form, presenting a loop adapted to embrace a part of the mechanism which is movable relatively to said shock absorber with the limbs of the loop of said flexible member passing over said guide and a clamping saddle formed to fit the limbs of said loop, securing the ends of said flexible member to said arm.

5. In combination with the frame and the axle of a vehicle, a shock absorber connected to said frame and having force-resisting means including a pivotally mounted arm provided at its ends with a downwardly curving guide, a flexible member connected at its ends to said arm passing over said guide and presenting a loop, a bracket secured to said axle, having an arm engaging the bight of said loop, provided with a guide-way for the limbs of said loop located beneath, but at one side of the vertical axial plane of said curved guide.

6. In combination with the frame and axle of a vehicle, a shock absorber connected to said frame and having force-resisting means including a pivotally mounted arm provided at its end with a downwardly curving guide, a flexible member connected at its ends to said arm, passing over said guide and presenting a loop, a bracket secured to said axle having an arm to engage the bight of said loop, provided with a guide-way for the limbs of said loop, located beneath said curved guide.

7. In combination with the frame and axle of a vehicle, a shock absorber connected to said frame, having force-resisting means including a pivotally mounted arm provided with a downwardly curving guide, a flexible member, connected at its ends to said arm, passing over said guide, and presenting a loop, a bracket secured to said axle having an arm adapted to engage the bight of said loop and provided with a bifurcated end to guide the limbs of the loop, and a pin connecting the members of said bifurcated end having an extension located beneath the guide of said shock absorber arm adapted to support said arm in case of breakage or other disability of the shock absorber.

8. In combination with a shock absorber secured to one of two relatively movable members and having force-resisting means, and means connecting said force-resisting means to the other relatively movable member extending at an angle to the vertical plane of the force-resisting means whereby a lateral tension will always be maintained upon said force-resisting means.

9. In combination with a shock absorber secured to one of two relatively movable members and having a pivotally mounted force-resisting arm, and flexible means connecting said force-resisting arm to the other relatively movable member extending at an angle to the plane of reciprocation of said arm whereby a lateral tension will always be maintained upon said arm.

In testimony whereof, I have signed my name to this specification.

RALPH M. LOVEJOY.